United States Patent
Fukuta et al.

(10) Patent No.: US 9,742,324 B2
(45) Date of Patent: Aug. 22, 2017

(54) INTEGRATED CIRCUIT

(71) Applicant: DENSO CORPORATION, Kariya, Aichi-pref. (JP)

(72) Inventors: Junichi Fukuta, Kariya (JP); Koichi Nishibata, Kariya (JP); Hiroya Tsuji, Kariya (JP); Yusuke Shindo, Kariya (JP); Shinichiro Nakata, Kariya (JP); Yasutaka Senda, Kariya (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 15/016,923

(22) Filed: Feb. 5, 2016

(65) Prior Publication Data

US 2016/0233800 A1     Aug. 11, 2016

(30) Foreign Application Priority Data

Feb. 6, 2015 (JP) ................................ 2015-022650

(51) Int. Cl.
    *H02H 7/08*             (2006.01)
    *H02P 6/16*             (2016.01)
    *H02P 29/028*       (2016.01)

(52) U.S. Cl.
    CPC .............. *H02P 6/16* (2013.01); *H02P 29/028* (2013.01)

(58) Field of Classification Search
    CPC ................................ H02P 6/16; H02P 29/028
    USPC .................................................... 318/400.21
    See application file for complete search history.

(56) References Cited

U.S. PATENT DOCUMENTS

| 6,137,705 | A | * | 10/2000 | Maekawa | ......... H02M 7/53873 363/132 |
|---|---|---|---|---|---|
| 6,194,856 | B1 | * | 2/2001 | Kobayashi | ............ H02M 7/003 318/432 |
| 2003/0221668 | A1 | * | 12/2003 | Hashimoto | ........... F02D 11/105 123/396 |
| 2006/0266575 | A1 | * | 11/2006 | Nagase | .................. B62D 5/046 180/446 |
| 2014/0067233 | A1 | * | 3/2014 | Nishida | .................... F02D 41/20 701/103 |
| 2016/0294405 | A1 | * | 10/2016 | Higuchi | ................. H02H 3/006 |

FOREIGN PATENT DOCUMENTS

JP        2004-242370 A    8/2004
JP        5141149 B2    2/2013

\* cited by examiner

*Primary Examiner* — Erick Glass
(74) *Attorney, Agent, or Firm* — Oliff PLC (57) ABSTRACT

In an integrated circuit formed into a single chip, a drive signal generating unit generates drive signals for switching elements of a power conversion circuit. A monitoring unit monitors a microcomputer that calculates generation information that is information used to generate the drive signals, and determines whether or not an abnormality has occurred in the microcomputer. An angle converting unit converts an output signal of an angle sensor to rotation angle information of a rotating electric machine. A drive signal generating unit generates the drive signals for controlling driving of the rotating electric machine based on the generation information and the rotation angle information when the monitoring unit determines that an abnormality has not occurred in the microcomputer, and generates the drive signals based on the rotation angle information, without using the generation information, when the monitoring unit determines that an abnormality has occurred in the microcomputer.

15 Claims, 6 Drawing Sheets

INTEGRATED CIRCUIT

CROSS-REFERENCE TO RELATED APPLICATION

This application is based on and claims the benefit of priority from Japanese Patent Application No. 2015-022650, filed Feb. 6, 2015. The entire disclosure of the above application is incorporated herein by reference.

BACKGROUND

Technical Field

The present disclosure relates to an integrated circuit that is formed into a single chip and is applied to a control system of a rotating electric machine that is electrically connected to a power conversion circuit.

Related Art

As can be seen in Japanese Patent Publication No. 5141149, as this type of integrated circuit, an integrated circuit that includes therein a resolver-to-digital (RD) converter and a microcomputer for controlling the driving of a rotating electric machine (motor) is known. Specifically, the RD converter converts a rotation angle signal from a resolver to a digital signal. The rotation angle signal indicates the rotation angle of the motor. The microcomputer generates a drive signal (pulse width modulation (PWM) signal) for a switching element based on the digital signal obtained by the conversion performed by the RD converter.

When an abnormality occurs in the microcomputer, the reliability of a signal outputted from the microcomputer may decrease. When the drive signal for driving the switching element is generated based on a signal with reduced reliability, there is concern that, for example, controllability of the motor will decrease.

SUMMARY

It is thus desired to provide an integrated circuit that is capable of generating a drive signal for a switching element without reducing the reliability of the drive signal, even when an abnormality occurs in a microcomputer.

An exemplary embodiment of the present disclosure provides an integrated circuit that is formed into a single chip and is applied to a control system of a rotating electric machine that is electrically connected to a power conversion circuit. The integrated circuit includes:

(1) a drive signal generating unit that is incorporated in the integrated circuit, and generates drive signals for switching elements (Sup to Swn) configuring the power conversion circuit;

(2) a monitoring unit that is incorporated in the integrated circuit, monitors a microcomputer that is provided separately from the integrated circuit and calculates generation information that is information used to generate the drive signals, the monitoring unit determining whether or not an abnormality has occurred in the microcomputer; and (3) an angle converting unit that is incorporated in the integrated circuit, receives an output signal from an angle sensor that outputs the output signal based on a rotation angle of the rotating electric machine, and converts the output signal of the angle sensor to rotation angle information of the rotating electric machine.

The drive signal generating unit is configured to: (i) generate the drive signals for controlling driving of the rotating electric machine based on the generation information calculated by the microcomputer and the rotation angle information obtained by conversion by the angle converting unit when the monitoring unit determines that an abnormality has not occurred in the microcomputer; and (ii) generate the drive signals based on the rotation angle information, without using the generation information, when the monitoring unit determines that an abnormality has occurred in the microcomputer.

The integrated circuit of the exemplary embodiment includes therein the monitoring unit, the angle converting unit, and the drive signal generating unit. The monitoring unit monitors the microcomputer. The angle converting unit converts the output signal from the angle sensor to the rotation angle information of the rotating electric machine. The drive signal generating unit generates the drive signals for the switching elements. When the monitoring unit determines that an abnormality has not occurred in the microcomputer, the drive signal generating unit generates the drive signals for controlling the driving of the rotating electric machine based on the generation information calculated by the microcomputer and the rotation angle information obtained by conversion by the angle converting unit. As a result, the switching elements are driven based on the generated drive signals. Driving of the rotating electric machine is thereby controlled.

Here, in the exemplary embodiment, the drive signal generating unit and the angle converting unit are incorporated in the integrated circuit that is provided separately from the microcomputer. The drive signal generating unit generates the drive signals for the switching elements. The angle converting unit outputs the rotation angle information necessary for generating the drive signals. Therefore, even when the monitoring unit determines that an abnormality has occurred in the microcomputer, the drive signal generating unit is able to generate the drive signals based on the rotation angle information outputted from the angle converting unit, without using the generation information calculated by the microcomputer. That is, as a fail-safe measure, drive signals can be generated in the integrated circuit, without the microcomputer, during a microcomputer abnormality. Therefore, reduction in the reliability of drive signals can be avoided. As a result, even when the monitoring unit determines that an abnormality has occurred in the microcomputer, the switching elements can be driven, for example, to continue drive control of the rotating electric motor.

DESCRIPTION OF THE EMBODIMENTS

Figure 1:
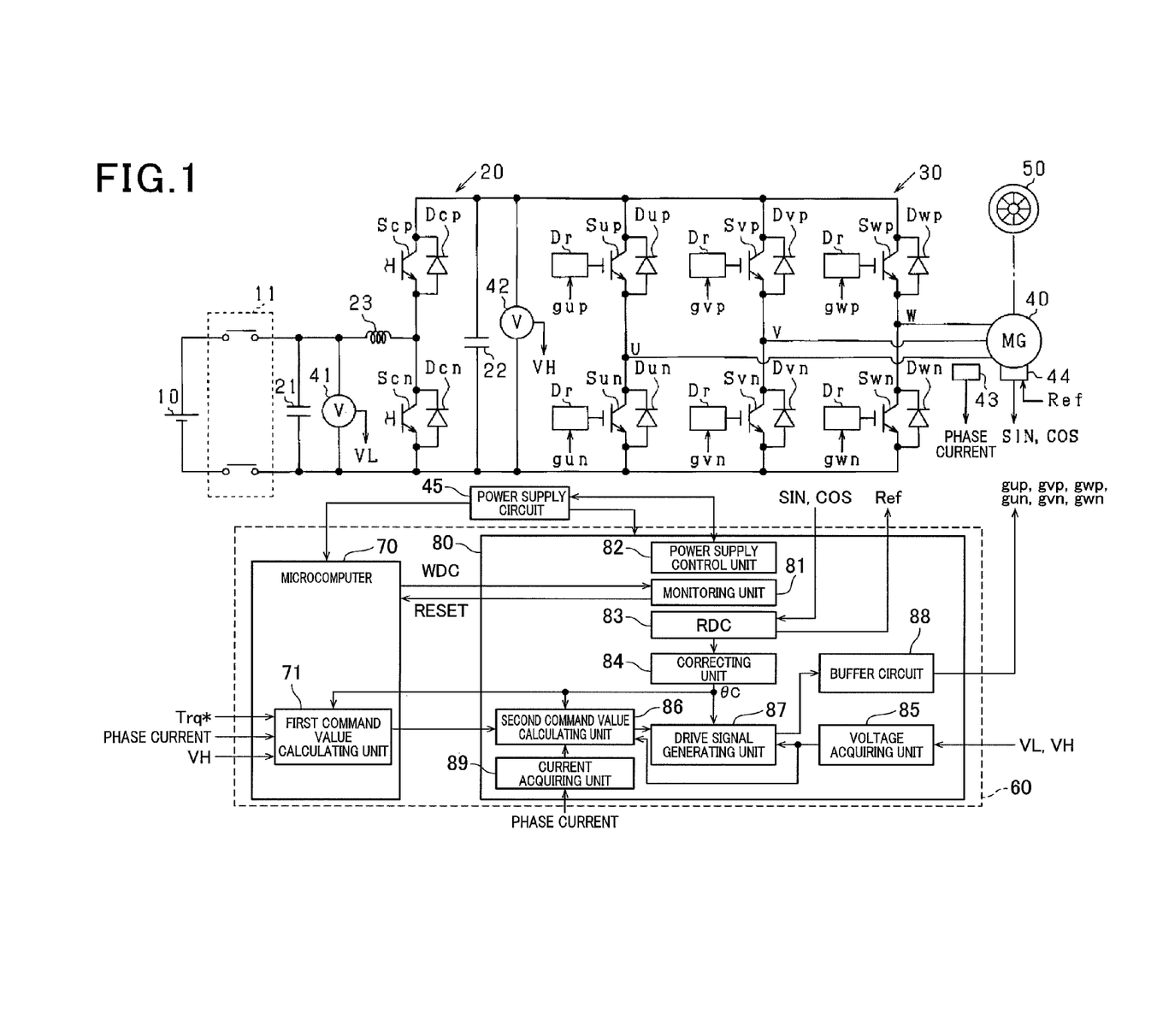
FIG. 1 is an overall configuration diagram of an onboard motor control system according to an embodiment.

An embodiment of an integrated circuit for driving a switching element of the present disclosure will hereinafter be described with reference to the drawings. According to the embodiment, the integrated circuit is applied to a vehicle (parallel hybrid car) that is provided with a rotating electric machine (motor generator) and an engine as onboard main machines As shown in FIG. 1, the vehicle includes a high-voltage battery 10, a step-up converter 20, an inverter 30, a motor generator 40, a driving wheel 50, and a control unit 60.

The motor generator 40 is an onboard main machine The motor generator 40 is capable of transmitting power to the driving wheel 50. The motor generator 40 is electrically connected to the high-voltage battery 10 via the inverter 30, the step-up converter 20, and a system main relay 11. The motor generator 40 has a three-phase winding in which the windings are connected by a star connection at a neutral point. According to the present embodiment, a permanent magnet synchronous motor is used as the motor generator 40. More specifically, an interior permanent magnet synchronous motor (IPMSM) that is a salient-pole motor is used. The high-voltage battery 10 is a storage battery that, for example, has an inter-terminal voltage of 100 V or higher. For example, a lithium-ion storage battery or a nickel-hydrogen storage battery can be used as the high-voltage battery 10.

The step-up converter 20 includes a first capacitor 21, a second capacitor 22, a reactor 23, and a serially connected member composed of upper- and lower-arm step-up switching elements Scp and Scn. Specifically, the high-voltage battery 10 is connected in parallel to the first capacitor 21 via the system main relay 11. The connection point of the step-up switching elements Scp and Scn is connected to a first terminal of the first capacitor 21, with the reactor 23 therebetween. The second capacitor 22 is connected in parallel to the serially connected member composed of the step-up switching elements Scp and Sen. As a result, the step-up converter 20 provides a function of stepping up the inter-terminal voltage of the high-voltage battery 10 with a predetermined voltage (such as "650 V") as an upper limit, by turning ON/OFF the step-up switching elements Scp and Scn. According to the present embodiment, voltage-control type semiconductor switching elements are used as the step-up switching elements Sep and Scn. Specifically, insulated-gate bipolar transistors (IGBTs) are used. Freewheeling diodes Dcp and Den are respectively connected in anti-parallel to the step-up switching elements Scp and Scn.

The inverter 30 is provided with three serially connected members composed of U-, V-, and W-phase upper-arm switching elements Sup, Svp, Swp, and U-, V-, and W-phase lower-arm switching elements Sun, Svn, Swn. Each serially connected member is connected parallel to the second capacitor 22. The U-, V-, and W-phase windings of the motor generator 40 are respectively connected at one end to the respective connection points of the serially connected members. According to the present embodiment, voltage-control type semiconductors are used as the switching elements Sup to Swn. Specifically, IGBTs are used. Freewheeling diodes Dup, Dun, Dvp, Dvn, Dwp, and Dwn are respectively connected in anti-parallel to the switching elements Sup, Sun, Svp, Svn, Swp, and Swn. The inverter 30, rather than the step-up converter 20, may be provided with the second capacitor 22.

A control system according to the present embodiment includes a first voltage sensor 41, a second voltage sensor 42, a phase current sensor 43, and an angle sensor 44. The first voltage sensor 41 is a first voltage detecting means for detecting an inter-terminal voltage of the first capacitor 21. The second voltage sensor 42 is a second voltage detecting means for detecting an inter-terminal voltage of the second capacitor 22. The phase current sensor 43 is a phase current detecting means for detecting each phase current (current on a three-phase fixed coordinate system) flowing to the motor generator 40. The phase current sensor 43 may be configured to detect the currents of at least two of the three phases.

The angle sensor 44 is a sensor for detecting the rotation angle (electrical angle) of the motor generator 40. According to the present embodiment, a resolver is used as the angle sensor 44. Specifically, the resolver according to the present embodiment is a one-phase excitation two-phase output type that includes a primary-side coil, and first and second secondary-side coils. The primary-side coil is connected to a rotor of the motor generator 40. The primary-side coil is excited by a sinusoid excitation signal Ref that is outputted from the control unit 60 (specifically, an RD converter 83 (resolver-to-digital converter) of an integrated circuit 80). Magnetic flux generated in the primary-side coil by the excitation signal Ref interlinks with the first and second secondary-side coils. At this time, the relative arrangement relationship between the primary-side coil and the first and second secondary-side coils periodically changes depending on the electrical angle of the rotor. Therefore, the number of magnetic fluxes that interlink with the first and second secondary-side coils periodically changes.

According to the present embodiment, the first and second secondary-side coils and the primary-side coil are arranged such that the phases of the voltages respectively generated in the first and second secondary-side coils are shifted from each other by "π/2". As a result, the respective output voltages of the first and second secondary-side coils are modulated waves respectively obtained by an excitation signal Ref being modulated by modulating waves sin θ and cos θ. More specifically, when the excitation signal Ref is "sin Ωt", the modulated waves are respectively "sin θ×sin Ωt" and "cos θ×sin Ωt". According to the present embodiment, the respective output voltages (analog signals) of the two secondary-side coils are referred to, hereafter, as simply SIN and COS.

The control system further includes a power supply circuit 45. The power supply circuit 45 serves as a power supply source for the control unit 60 and the like.

The control unit 60 includes a microcomputer 70 and the integrated circuit 80 that is formed into a single chip. The control unit 60 uses the power supply circuit 45 as a power supply source. The control unit 60 operates the step-up converter 20 and the inverter 30 so as to control a controlled variable (torque, according to the present embodiment) of the motor generator 40 to a command value (command torque). Specifically, the control unit 60 turns ON/OFF the step-up switching elements Scp and Scn of the step-up converter 20. In addition, the control unit 60 outputs drive signals gup, gun, gvp, gvn, gwp, and gwn to respective drive circuits Dr provided for the switching elements Sup, Sun, Svp, Svn, Swp, and Swn of the inverter 30, to turn ON/OFF the switching elements Sup to Swn. Here, the drive signals gup, gvp, and gwp of the upper-arm side and the corresponding drive signals gun, gvn, and gwn of the lower-arm side are signals that complement each other. In other words, the upper-arm switching elements Sup, Svp, and Swp and the corresponding lower-arm switching elements Sun, Svn, and Swn are alternately turned ON. In FIG. 1, drive circuits that drive the step-up switching elements Scp and Scn are omitted.

According to the present embodiment, the high-voltage battery 10, the step-up converter 20, each drive circuit Dr, the inverter 30, and the motor generator 40 configure an onboard high-voltage system. The control unit 60 and the power supply circuit 45 configure an onboard low-voltage system that is electrically insulated from the high-voltage system.

In the control unit 60, the microcomputer 70 includes, therein, a first command value calculating unit 71. The integrated circuit 80 is configured as an application specific integrated circuit (ASIC). In the integrated circuit 80, an integrated circuit providing a function of monitoring the operations of the microcomputer 70 and a function of controlling the power supply circuit 45 also includes a function of detecting the rotation angle of the motor generator 40 and a function of generating the above-described drive signals. Specifically, a monitoring unit 81, a power supply control unit 82, the RD converter 83 (corresponding to an "angle converting unit"), a correcting unit 84, a voltage acquiring unit 85, a second command value calculating unit 86, a drive signal generating unit 87, a buffer circuit 88, and a current acquiring unit 89 are incorporated in the integrated circuit 80. The microcomputer 70 and the integrated circuit 80 will be described in detail hereafter.

In the integrated circuit 80, the monitoring unit 81 monitors the microcomputer 70. The monitoring unit 81 provides a function of outputting a reset signal RESET to the microcomputer 70 when determined that an abnormality has occurred in the microcomputer 70. Specifically, when determined that a watchdog signal is not inputted from the microcomputer 70 to the monitoring unit 81 within a predetermined amount of time, the monitoring unit 81 determines that an abnormality has occurred in the microcomputer 70. When the reset signal RESET is inputted to the microcomputer 70, the microcomputer 70 is reset.

The power supply control unit 82 provides a function of detecting a direct-current voltage outputted from the power supply circuit 45 to the control unit 60, and operating the power supply circuit 45 such that the detected direct-current voltage is controlled to a target voltage. In addition, the power supply control unit 82 provides a monitoring function for determining whether or not an abnormality has occurred in the power supply circuit 45 based on the detection value of the direct-current voltage outputted from the power supply circuit 45. Specifically, when determined that the detection value of the direct-current voltage is an allowable lower-limit value thereof or lower, or an allowable upper-limit value thereof, the power supply control unit 82 determines that an abnormality has occurred in the power supply circuit 45.

The RD converter 83 provides a function of outputting the excitation signal Ref to the angle sensor 44. The RD converter 83 also provides a function of converting the analog signals SN and COS outputted from the angle sensor 44 to digital signals. The RD converter 83 then inputs the converted digital signals to the correcting unit 84. The correcting unit 84 calculates a corrected electrical angle θc based on the digital signals. The correcting unit 84 will be described hereafter.

Figure 2:
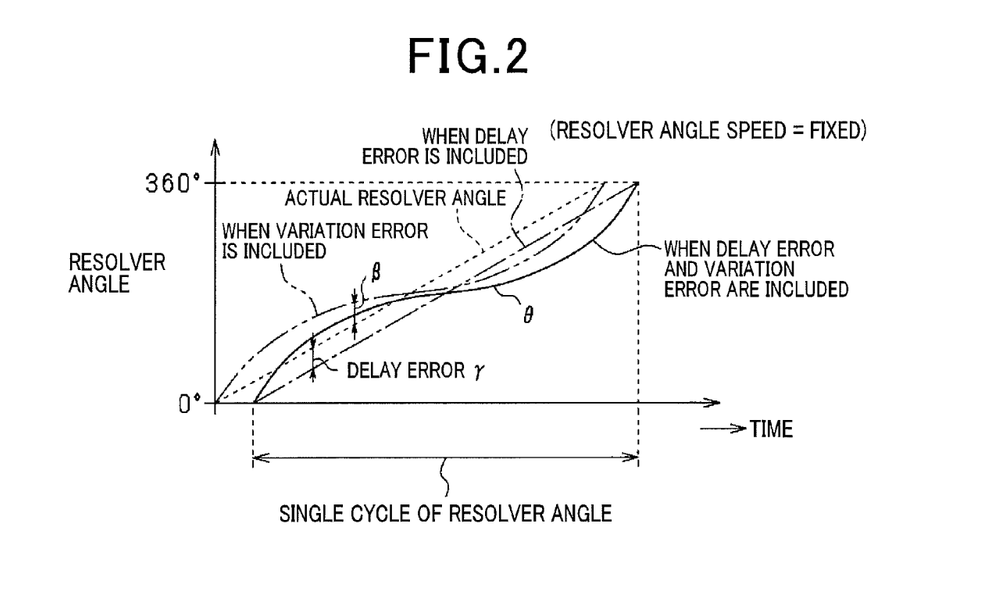
FIG. 2 is a diagram of errors included in an electrical angle.

First, errors included in a detected angle (hereafter, a resolver angle) of the angle sensor 44 will be described with reference to FIG. 2. FIG. 2 shows the transition of the resolver angle at a fixed resolver angle speed. The errors include variation error β and delay error γ. First, the variation error β will be described. The variation error β is a sine wave-shaped error that has a cycle that is an integral multiple of a single cycle of the resolver angle. That is, the resolver angle when the variation error β is included is a value in which the variation error β is superimposed onto the actual resolver angle. An example of the transition of the resolver angle when the actual resolver angle (broken line in FIG. 2) includes the variation error β having the same cycle as a single cycle of the resolver angle is indicated by a two-dot chain line in FIG. 2.

Next, the delay error γ will be described. The resolver angle when the delay error γ is included is a value (single-dot chain line in FIG. 2) that is delayed by a predetermined angle in relation to the actual resolver angle (broken line in FIG. 2). Specifically, for example, the resolver angle when the delay error γ is included in addition to the variation error β having the same cycle as a single cycle of the resolver angle is a value in which the variation error β is superimposed onto the value that is delayed by the predetermined angle in relation to the actual resolver angle, as indicated by the solid line n FIG. 2.

Here, when the resolver angle includes the delay error γ or the variation error β, the accuracy of ascertaining the resolver angle decreases, leading to a decrease in the accuracy of ascertaining the electrical angle. As a result, torque controllability of the motor generator 40 may decrease. In particular, the delay error y tends to increase as the resolver angle speed increases. Therefore, when a switching operation is performed in the inverter 30 at a high frequency range, deterioration of torque controllability of the motor generator 40 may become significant.

Figure 3:
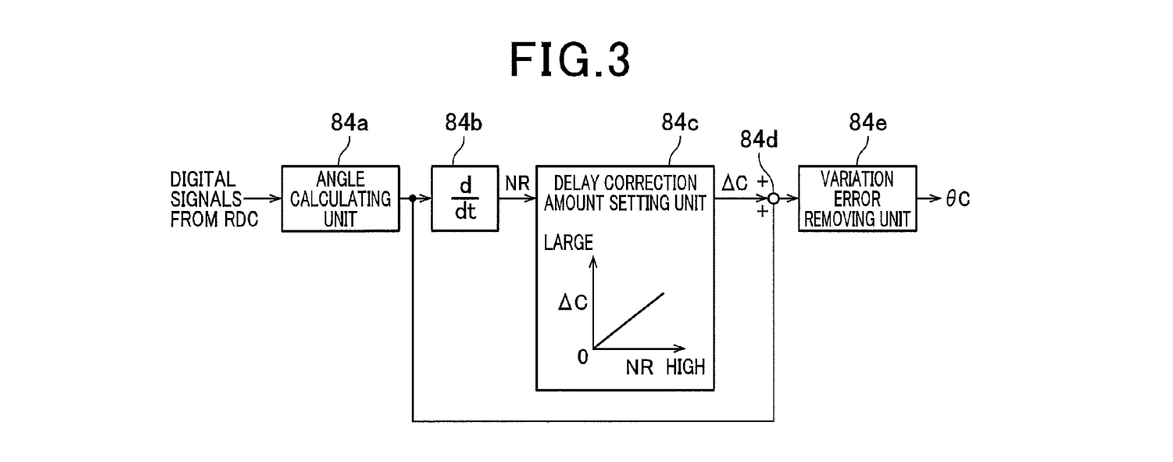
FIG. 3 is a block diagram of a process for removing errors included in the electrical angle in an integrated circuit.

To avoid such situations, according to the present embodiment, the correcting unit 84 is incorporated in the integrated circuit 80. Hereafter, a process performed by the correcting unit 84 will be described with reference to FIG. 3. As shown in FIG. 3, an angle calculating unit 84a calculates the resolver angle based on the digital signals obtained by the conversion by the RD converter 83. The angle calculating unit 84a is configured to include an encoder, for example. A speed calculating unit 84b calculates a resolver angle speed NR based on the resolver angle outputted from the angle calculating unit 84a.

A delay correction amount setting unit 84c sets a delay correction amount ΔC based on the resolver angle speed NR outputted from the speed calculating unit 84b. Specifically, the delay correction amount setting unit 84c sets the delay correction amount ΔC to a higher value as the resolver angle speed NR increases. Here, according to the present embodiment, regarding the delay correction amount ΔC, the value is positive towards the advance angle of the electrical angle of the rotor (the rotation direction of the rotor).

An adding unit 84d adds the resolver angle outputted from the angle calculating unit 84a and the delay correction amount ΔC outputted from the delay correction amount setting unit 84c. As a result, the delay error γ is removed from the resolver angle.

A variation error removing unit 84e removes the variation error β from the resolver angle. Here, as a method for removing the variation error β, for example, a known method such as that described in JP-A-2004-242370 may be used. A simple description of this method is as follows. First, in a state in which the resolver angle speed NR is fixed or a state in which variation in the resolver angle speed NR is minimal, a prediction value of the resolver angle is calculated based on an average value of the resolver angle over a prescribed period. Here, the prescribed period is a single cycle of the resolver angle. Correction to increase or decrease the resolver angle is performed during the next prescribed period based on the difference between the calculated prediction value and the output value from the adding unit 84d. In FIG. 3, the electrical angle calculated based on the resolver angle from which the variation error β and the delay error γ have been removed by the correcting unit 84 is indicated by θc.

Figure 4:
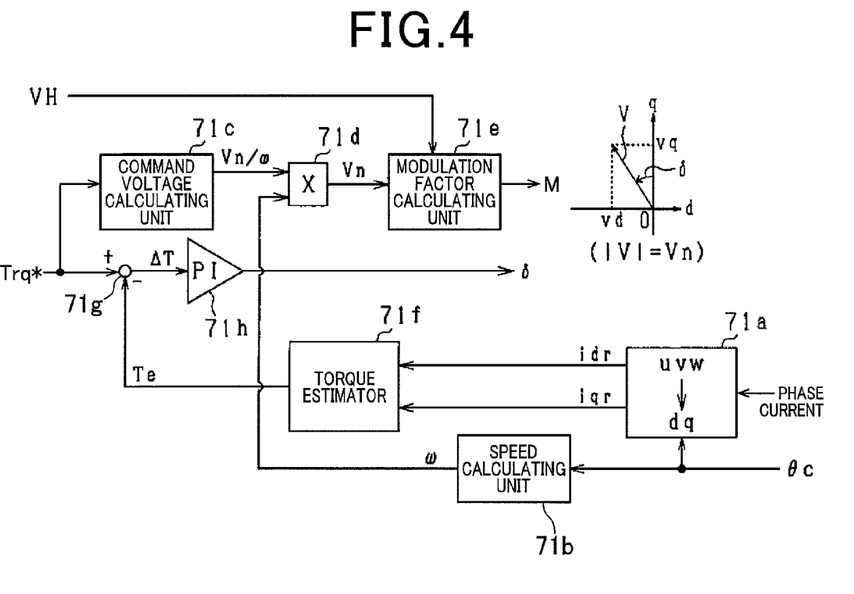
FIG. 4 is a block diagram of a process for calculating a modulation factor and a voltage phase in a microcomputer.

Returning to the earlier FIG. 1, in the microcomputer 70, the first command value calculating unit 71 calculates information for generating the drive signals gup to gwn, based on the voltage (hereafter, second voltage VH) detected by the second voltage sensor 42, the phase currents detected by the phase current sensor 43, and the electrical angle θc outputted from the correcting unit 84 of the integrated circuit 80. FIG. 4 shows a block diagram of a process performed by the first command value calculating unit 71 according to the present embodiment. According to the present embodiment, torque feedback control is described as an example.

A two-phase converter 71a converts the U-, V-, W-phase currents on the three-phase fixed coordinate system to a d-axis current idr and a q-axis current iqr on a two-phase rotation coordinate system (dq coordinate system), based on the phase currents detected by the phase current sensor 43 and the electrical angle θc. A speed calculating unit 71b calculates an electrical angle speed ω based on the electrical angle θc.

A command voltage calculating unit 71c calculates a normalized voltage magnitude "Vn/ω" with a command torque Trq* as input. Here, the normalized voltage magnitude "Vn/ω" refers to a value obtained by a magnitude command value (hereafter, voltage magnitude Vn) of an output voltage vector V of the inverter 30 on the two-phase rotation coordinate system being divided by the electrical angle speed ω. The magnitude Vn of the output voltage vector V is defined as the square root of the sum of the square of a d-axis component vd and the square of a q-axis component vq of the output voltage vector V. In addition, for example, the voltage magnitude Vn may be calculated through the use of a map in which the command torque Trq* and the voltage magnitude Vn are associated.

A speed multiplying unit 71d calculates the voltage magnitude Vn by multiplying the normalized voltage magnitude "Vn/ω" with the electrical angle speed ω. A modulation factor calculating unit 71e calculates a modulation factor M that is a value obtained by the voltage magnitude Vn being normalized by the second voltage VH.

A torque estimator 71f calculates an estimated torque Te of the motor generator 40 based on the d-axis current idr and the q-axis current iqr outputted from the two-phase converting unit 71a. Here, the estimated torque Te may be calculated through use of a map that stores therein a relationship between the d-axis current idr and the q-axis current iqr, and the estimated torque Te. Alternatively, the estimated torque Te may be calculated through use of a model formula.

A torque deviation calculating unit 71g calculates a torque deviation ΔT by subtracting the estimated torque Te from the command torque Trq*.

A phase calculating unit 71h calculates a voltage phase δ based on the torque deviation ΔT. The voltage phase δ serves as a manipulated variable for performing feedback control of the estimated torque Te to the command torque Trq*. According to the present embodiment, when the torque deviation voltage phase δ is inputted, the phase calculating unit 71h calculates the voltage phase δ by proportional-plus-integral control.

Returning to the earlier FIG. 1, in the integrated circuit 80, the voltage acquiring unit 85 acquires the voltage (hereafter, first voltage VL) detected by the first voltage sensor 41 and the second voltage VH. The current acquiring unit 89 acquires the phase currents detected by the phase current sensor 43.

The voltages acquired by the voltage acquiring unit 85, the phase currents acquired by the current acquiring unit 89, and the electrical angle θc outputted from the correcting unit 84 are inputted to the second command value calculating unit 86. When the monitoring unit 81 determines that an abnormality has not occurred in the microcomputer 70, or when the power supply control unit 82 determines that an abnormality has not occurred in the power supply circuit 45, the second command value calculating unit 86 allows the voltage command values (modulation factor M and voltage phase δ) outputted from the first command value calculating unit 71 to pass and outputs the voltage command values to the drive signal generating unit 87. Meanwhile, when the monitoring unit 81 determines that an abnormality has occurred in the microcomputer 70, or when the power supply control unit 82 determines that an abnormality has occurred in the power supply circuit 45, the second command value calculating unit 86 provides a function of generating, on its own, the voltage command values for generating the drive signals. This function will be described in detail hereafter.

The drive signal generating unit 87 generates the drive signals gup to gwn based on the electrical angle θc outputted from the correcting unit 84, the voltages VL and VH acquired by the voltage acquiring unit 85, and the modulation factor M and the voltage phase δ outputted from the first command value calculating unit 71 of the microcomputer 70. For example, the drive signals gup to gwn may be generated as follows. The drive signal generating unit 87 stores a waveform (pulse pattern) of the drive signal over a single cycle of the electrical angle as map data for each modulation factor M. The drive signal generating unit 87 selects the pulse pattern corresponding to the inputted modulation factor M. Upon selecting the pulse pattern, the drive signal generating unit 87 sets the output timing of the pulse pattern based on the voltage phase δ, thereby generating the drive signal gup to gwn.

The method for generating the drive signals gup to gwn may be, for example, a method based on current feedback control, described hereafter. The first command value calculating unit 71 of the microcomputer 70 calculates a three-phase command voltage on the three-phase fixed coordinate system of the motor generator 40 based on the phase currents and the electrical angle θc. The three-phase command voltage serves as a manipulated variable for performing feedback control of the d- and q-axis currents idr and iqr to d- and q-axis command currents. The first command value calculating unit 71 then outputs the three-phase command voltage to the second command voltage calculating unit 86. The drive signal generating unit 87 generates the drive signals gup to gwn based on the three-phase command voltage and the second voltage VH inputted via the second command value calculating unit 86. Specifically, the drive signal generating unit 87 generates the drive signals gup to gwn by a PWM process based on a size comparison of the three-phase command voltage normalized based on the second voltage VH and a carrier signal (such as a triangular-wave signal).

The drive signals gup to gwn generated by the drive signal generating unit 87 are outputted to the respective drive circuits Dr, via the buffer circuit 88 corresponding to the switching elements Sup to Swn and an insulating element (such as a photocoupler) (not shown) that is driven by the buffer circuit 88. As a result, the switching elements Sup to Swn are driven.

Figure 5:
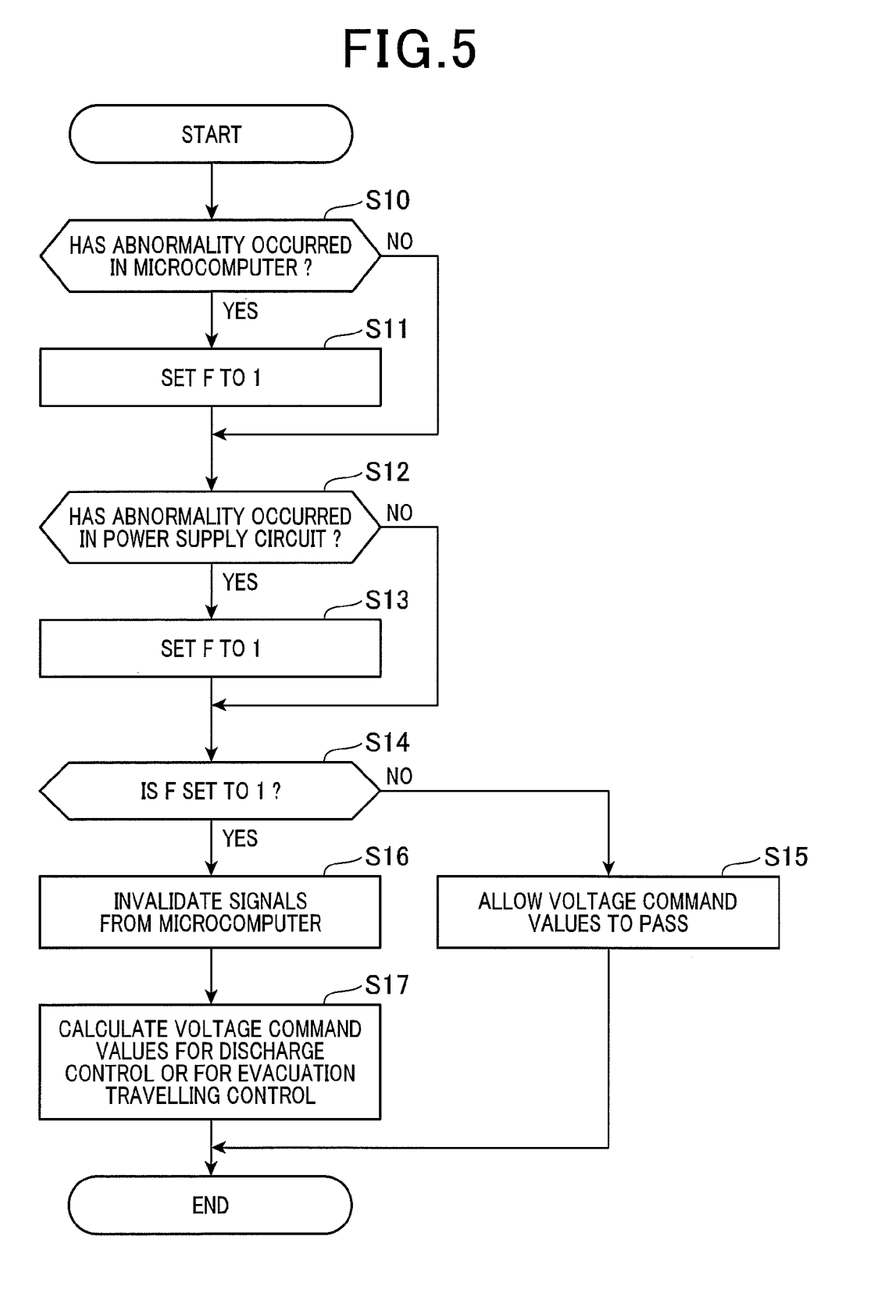
FIG. 5 is a flowchart of a process performed by a drive signal generating unit in the integrated circuit.

Next, processes performed by the second command value calculating unit 86 when the monitoring unit 81 determines that an abnormality has occurred in the microcomputer 70 or when the power supply control unit 82 determines that an abnormality has occurred in the power supply circuit 45 will be described with reference to FIG. 5. The processes shown in FIG. 5 are repeatedly performed at a predetermined cycle, for example, by the second command value calculating unit 86.

In this series of processes, first, at step S10, the second command value calculating unit 86 determines whether or not a notification that an abnormality has occurred in the microcomputer 70 is received from the monitoring unit 81. When determined YES at step S10, the second command value calculating unit 86 proceeds to step S11. The second command value calculating unit 86 sets an abnormality determination flag F to 1. The abnormality determination flag F indicates that an abnormality has occurred in the microcomputer 70 or the power supply circuit 45 when set to 1. The abnormality determination flag F indicates that the abnormality has not occurred when set to 0. The initial value of the abnormality determination flag F is set to 0.

When determined NO at step S10 or when the process at step S11 is completed, the second command value calculating unit 86 proceeds to S12. At step S12, the second command value calculating unit 86 determines whether or not a notification that an abnormality has occurred in the power supply circuit 45 is received from the power supply control unit 82. When determined YES at step S12, the second command value calculating unit 86 proceeds to step S13. The second command value calculating unit 86 sets the abnormality determination flag F to 1.

When determined NO at step S12 or when the process at step S13 is completed, the second command value calculating unit 86 proceeds to S14. At step S14, the second command value calculating unit 86 determines whether or not the value of the abnormality determination flag F is 1. When determined NO at step S14, the second command value calculating unit 86 proceeds to step S15. The second command value calculating unit 86 allows the voltage command values (specifically, the modulation factor M and the voltage phase δ) inputted from the first command value calculating unit 71 to pass and outputs the voltage command values to the drive signal generating unit 87. As a result, the drive signals gup to gwn for rotatably driving the motor generator 40 are generated with the modulation factor M and the voltage phase δ outputted from the microcomputer 70, and the electrical angle θc outputted from the correcting unit 84, as inputs.

Meanwhile, when determined YES at step S14, the second command value calculating unit 86 invalidates the voltage command values from the microcomputer 70. The second command value calculating unit 86 performs this process to properly avoid a situation in which incorrect drive signals gup to gwn are generated. That is, when an abnormality has occurred in the microcomputer 70 or when an abnormality has occurred in the power supply circuit 45 and the power supply voltage of the microcomputer 70 is not an appropriate voltage, the modulation factor M and the voltage phase δ calculated by the microcomputer 70 may be incorrect values.

In this case, when the voltage command values are calculated by the second command value calculating unit 86 based on the incorrect modulation factor M and voltage phase δ calculated by the microcomputer 70, the drive signals become incorrect. There is concern that discharge control and evacuation travelling control, described hereafter, may not be appropriately performed. Therefore, when the monitoring unit 81 determines that an abnormality has occurred in the microcomputer 70 or when the power supply control unit 82 determines that an abnormality has occurred in the power supply circuit 45, the modulation factor M and the voltage phase δ inputted to the second command value calculating unit 86 are invalidated, and a situation in which incorrect drive signals are generated is avoided.

At subsequent step S17, the second command value calculating unit 86 performs a process for calculating voltage command values for performing discharge control of the first and second capacitors 21 and 22, or evacuation travelling control of the vehicle. Specific examples of this process will be described below.

<1. Regarding Discharge Control>

In discharge control, to enable discharge of accumulated charges in the first and second capacitors 21 and 22, the drive signals gup to gwn for driving the upper- and lower-arm switching elements Sup to Swn of the inverter 30 are generated with the electrical angle θc outputted from the correcting unit 84 as input, in a state in which the system main relay 11 is turned OFF. According to the present embodiment, the voltage command values during discharge control are calculated by a process shown in FIG. 6 or FIG. 7.

Figure 6:
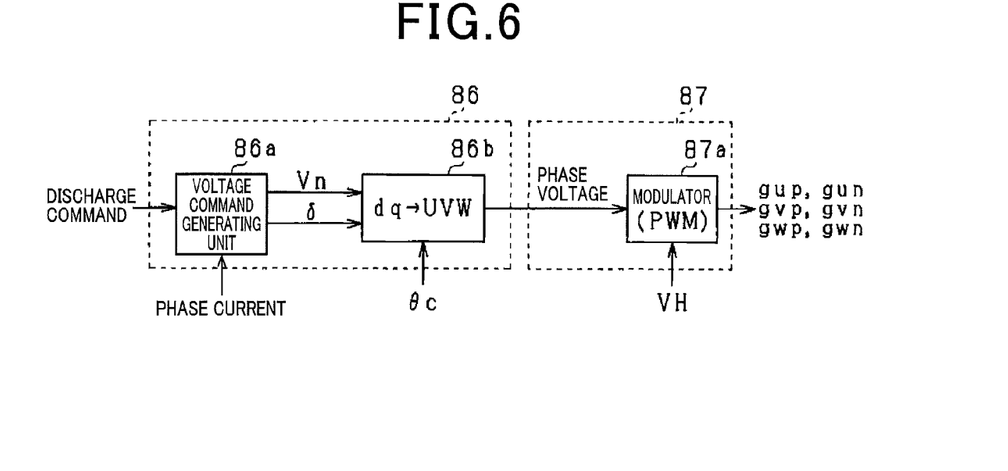
FIG. 6 is a block diagram of a discharge control process performed when a vehicle is stopped.

First, the process will be described with reference to FIG. 6. The process shown in FIG. 6 is performed, for example, when the vehicle is stopped. A voltage command generating unit 86*a* calculates the voltage magnitude Vn and the voltage phase δ as a result of receiving input of a discharge command from outside (such as a control unit that is of a higher order than the control unit 60). According to the present embodiment, the voltage command generating unit 86*a* calculates the voltage magnitude Vn and the voltage phase δ based on the phase currents acquired by the current acquiring unit 89. Therefore, discharge control can be performed while performing feedback of the current flowing to the motor generator 40. Even when the resistance value of a winding configuring the motor generator 40 changes due to the temperature of the motor generator 40 or the like, discharge control can be performed while adjusting the current with high accuracy.

The discharge command is inputted, for example, when the above-described control unit determines that the vehicle is involved in a collision. Here, whether or not the vehicle has collided may be determined, for example, based on the detection value of an acceleration sensor provided in the vehicle.

In addition, in a configuration in which the current acquiring unit 89 is not provided in the integrated circuit 80, predetermined voltage magnitude Vn and voltage phase δ may be outputted to a three-phase converting unit 86*b*.

The three-phase converting unit 86*b* calculates a three-phase command voltage on the three-phase fixed coordinate system based on the voltage magnitude Vn and the voltage phase δ outputted from the voltage command generating unit 86*a*, and the electrical angle θc outputted from the correcting unit 84. The three-phase converting unit 86*b* then outputs the three-phase command voltage to the drive signal generating unit 87.

In the drive signal generating unit 87, a modulator 87a generates the drive signal gup to gwn based on the three-phase command voltage outputted from the three-phase converting unit 86b and the second voltage VH. Specifically, the modulator 87b generates the drive signals gup to gwn by a PWM process based on a size comparison of the three-phase command voltage normalized based on the second voltage VH and a carrier signal.

Here, in the above-described discharge control, the output torque of the motor generator 40 can be set to zero by the voltage magnitude Vn and the voltage phase δ (δ=0° or 180°) being set such that the absolute value of the d-axis current is greater than 0, while setting the q-axis current to 0. The motor generator 40 can be prevented from being rotatably driven in accompaniment with the discharge control of the first and second capacitors 22.

The drive signals gup to gwn for performing discharge control can also be generated based on the voltages VL and VH acquired by the voltage acquiring unit 85. As a result, for example, the voltage command value (three-phase command voltage) can be normalized based on the second voltage VH. In addition, the drive signals gup to gwn that are based on the voltage command value can be generated. Therefore, the amount of current to flow to the motor generator 40 can be more accurately controlled. For example, the inter-terminal voltages of the capacitors 21 and 22 can be monitored. As a result, the discharge completion timings of the capacitors 21 and 22 can be known.

In addition, when the voltages VL and VH acquired by the voltage acquiring unit 85 are high, drive signals gup to gwn that increase the discharge speeds of the capacitors 21 and 22 to be higher than those when the voltages VL and VH are low may be generated. As a result, for example, the inter-terminal voltages of the capacitors 21 and 22 can be precisely reduced to a safe level during a prescribed amount of time.

Furthermore, when disconnection is determined to have occurred between the motor generator 40 and the inverter 30, discharge control may be performed to turn ON the upper-and lower-arm switching elements of the same phase in the inverter 30. This method is effective when the motor generator 40 cannot be used to discharge the capacitors 21 and 22. Here, Duty, which is the ratio of the ON period in relation to a single ON/OFF cycle of the upper- and lower-arm switching elements of the same phase, may be set to be higher as the voltages VL and VH decrease.

Because the d-axis direction can be known from the electrical angle θc, the second voltage VH and the phase currents are not required for the calculation of the voltage command values. Specifically, in a configuration in which the voltage acquiring unit 85 is not provided with the integrated circuit 80, for example, a predetermined fixed value may be used as the second voltage VH that is used in the modulator 87a. In addition, for example, the second voltage VH that is acquired from the microcomputer 70 through communication or the like before an abnormality occurs in the microcomputer 70 may be used as the second voltage VH that is used in the modulator 87a.

<2. Regarding Evacuation Travelling Control>

In this control, the drive signals gup to gwn for making the vehicle perform evacuation travelling are generated by the motor generator 40 being rotatably driven. For example, the evacuation travelling control may be performed under a condition that the driver is issuing an instruction for the vehicle to cruise. Here, for example, whether or not an instruction for the vehicle to cruise is being issued may be determined based on an operating state of an accelerator operating member (accelerator pedal) that is operated by the driver. A method for calculating the voltage command value during evacuation travelling control according to the present embodiment will be described below.

Figure 7:
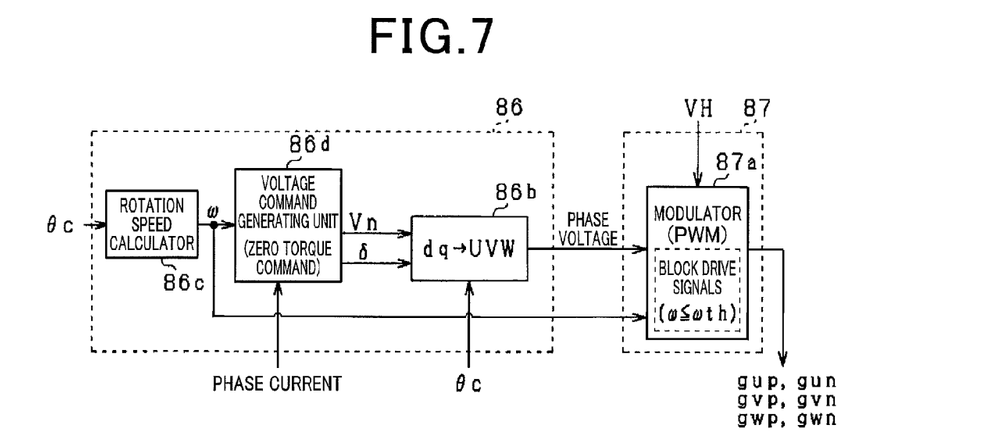
FIG. 7 is a block diagram of a zero torque control process using PWM.

First, the method will be described with reference to FIG. 7. In FIG. 7, processes that are the same as the processes shown in the earlier FIG. 6 are given the same reference numbers for convenience.

In the second command value calculating unit 86, a rotation speed calculator 86c calculates the electrical angle speed ω based on the electrical angle θc.

A voltage command generating unit 86d calculates the voltage magnitude Vn and the voltage phase δ for actualizing a zero torque command (Trq*=0). According to the present embodiment, the output torque of the motor generator 40 is set to zero by the voltage magnitude Vn and the voltage phase δ (δ=90°) being set such that the absolute value of the d-axis current is greater than 0, while setting the q-axis current to 0. Here, as a result of the voltage magnitude Vn being calculated based on the electrical angle speed ω, the current (d-axis current) flowing to the motor generator 40 can be reduced. The voltage magnitude Vn and the voltage phase δ outputted from the voltage command generating unit 86d is inputted to the three-phase converting unit 86b.

In the above-described zero torque control, the output torque of the motor generator 40 can be set to zero. Therefore, when an abnormality occurs in the microcomputer 70 or the power supply circuit 45 while the vehicle is travelling and the motor generator 40 is being rotatably driven, for example, vehicle control can be performed by engine control without interference from the output torque of the motor generator 40.

Here, according to the present embodiment, when notification is received from the second command value calculating unit 86 that an abnormality has occurred in the microcomputer 70 or the power supply circuit 45, and the electrical angle speed ω is determined to be a predetermined speed ωth or lower, the modulator 87a provides a blocking function for stopping output of the drive signals gup to gwn to the buffer circuit 88. This is based on the following. During low-speed rotation of the motor generator 40, regeneration for converting the kinetic energy of the vehicle to electrical energy via the motor generator 40 is not performed. As a result of all switching elements Sup to Swn configuring the inverter 30 being turned OFF, safety can be improved.

Because the d-axis direction can be known from the electrical angle θc, the second voltage VH and the phase currents are not required for the calculation of the voltage command values. In a configuration in which the voltage acquiring unit 85 is not provided with the integrated circuit 80, for example, a predetermined fixed value may be used as the second voltage VH that is used in the modulator 87a. In addition, for example, the second voltage VH that is acquired before an abnormality occurs in the microcomputer 70 may be used as the second voltage VH that is used in the modulator 87a.

In addition, a method for calculating the voltage command value during zero torque control may be that involving the above-described current feedback control based on the phase currents acquired by the current acquiring unit 89. In this case, the current serves as the direct controlled variable. Therefore, zero torque control can be performed with high accuracy.

Figure 8:
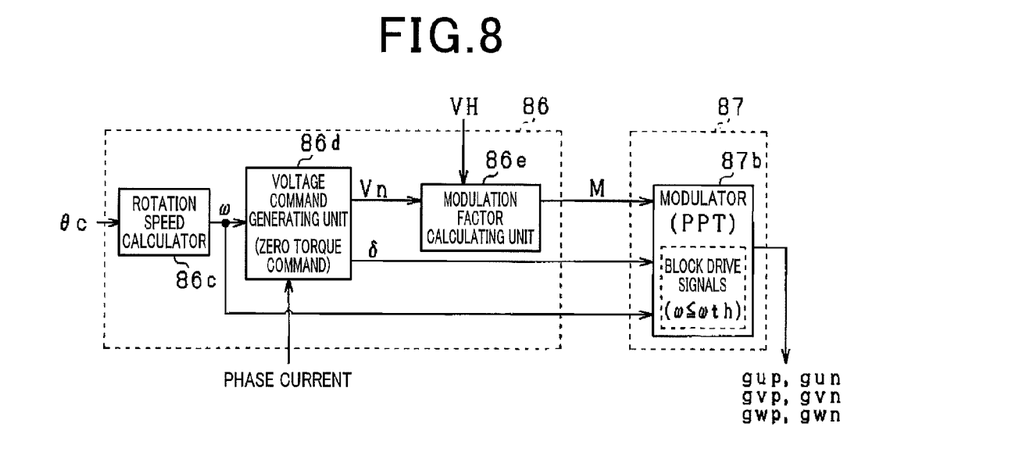
FIG. 8 is a block diagram of a zero torque control process using a pulse pattern.

Here, some of the processes shown in FIG. 7 can be changed to those in FIG. 8. Specifically, the second command value calculating unit 86 is provided with a modulation factor calculating unit 86e instead of the three-phase converting unit 86b. The modulation factor calculating unit 86e calculates the modulation factor M that is a value obtained by the voltage magnitude Vn being normalized by the second voltage VH.

In the drive signal generating unit 87, the modulator 87b generates the drive signals gup to gwn in which the above-described pulse pattern is used, based on the modulation factor M and the voltage phase δ. The modulator 87b also provides the above-described blocking function.

Figure 9:
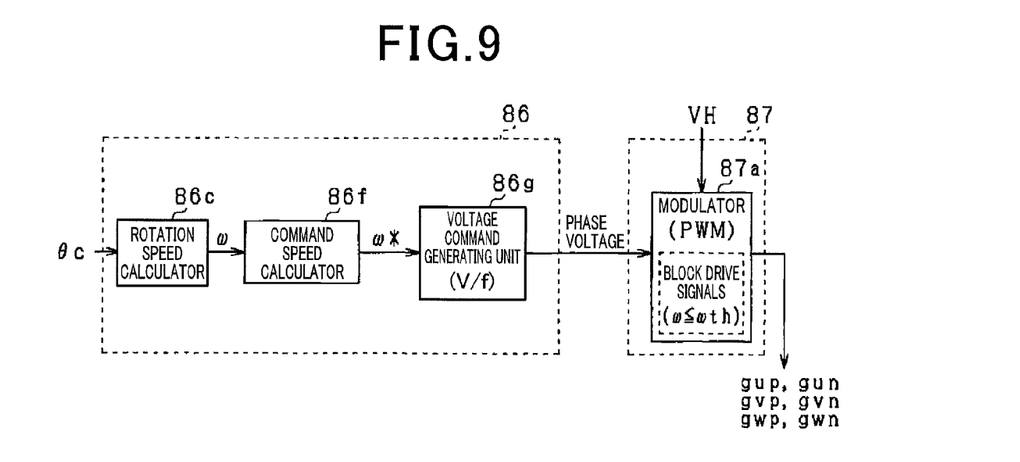
FIG. 9 is a block diagram of a voltage-frequency (V/f) control process.

Next, a process will be described with reference to FIG. 9. FIG. 9 shows a process for generating the drive signals gup to gwn that rotatably drive the motor generator 40 by V/f control. Processes in FIG. 9 that are the same as those shown in the earlier FIG. 7 are given the same reference numbers for convenience.

In the second command value calculating unit 86, the rotation speed calculator 86c calculates the electrical angle speed ω based on the electrical angle θc outputted from the correcting unit 84. A command speed calculator 86f calculates a command value of the electrical angle speed (command rotation speed ω*) based on the electrical angle speed ω. The command rotation speed ω* is variably set, for example, from the perspective of the extent of the rate of change in speed and the rotation speed to which to reduce the rotation speed of the motor generator 40 that is rotating at a high speed.

A voltage command generating unit 86g calculates the three-phase command voltage by V/f control based on the command rotation speed ω*. Here, the magnitude of the three-phase command voltage may be set based on the command rotation speed ω*. Specifically, for example, the magnitude can be set by the command rotation speed ω* being multiplied by a fixed value (>0). In addition, for example, the magnitude can be set through use of a map in which the magnitude of the three-phase command voltage associated with the command rotation speed ω* is prescribed. For example, the three-phase command voltage calculated by the voltage command generating unit 86g may be outputted to the modulator 87a synchronously with an electrical angle calculated by an integration operation being performed on the command rotation speed ω*.

The evacuation travelling control is not limited to that described above. Because the rotation speed of the motor generator 40 can be determined, for example, the rotation speed may be controlled to a target rotation speed by feedback control. In addition, the second voltage VH is not a requisite for the modulator 87a. In a configuration in which the voltage acquiring unit 85 is not provided with the integrated circuit 80, for example, a predetermined fixed value may be used as the second voltage VH that is used in the modulator 87a. In addition, for example, the second voltage VH that is acquired before an abnormality occurs in the microcomputer 70 may be used as the second voltage VH that is used in the modulator 87a. In addition, the three-phase command voltage may be calculated by the electrical angle speed ω calculated by the rotation speed calculator 86c being directly inputted to the voltage command generating unit 86g.

According to the present embodiment described in detail above, the following effects can be achieved.

(1) The drive signal generating unit 87 and the RD converter 83 are provided in the single integrated circuit 80 that is provided separately from the microcomputer 70. The drive signal generating unit 87 generates the drive signals gup to gwn of the upper- and lower-arm switching elements Sup to Swn that configure the inverter 30. The RD converter 83 outputs the electrical angle information necessary for generating the drive signals. In this configuration, even when the monitoring unit 81 provided in the integrated circuit 80 determines that an abnormality has occurred in the microcomputer 70, the integrated circuit 80 is provided with an angle information calculation function and a drive signal generation function. Therefore, the drive signals gup to gwn for discharge control and evacuation travelling can be generated.

(2) The electrical angle information is outputted to the microcomputer 70 from the RD converter 83, in addition to the second command value calculating unit 86 and the drive signal generating unit 87. Therefore, the RD converter 83 that generates the electrical angle information necessary for generating the drive signals is not required to be provided in the microcomputer 70. A microcomputer that includes therein the RD converter 83 is generally specific for motor drive control and is expensive. Therefore, according to the present embodiment, a general-purpose microcomputer that does not have the RD converter 83 can be used as the microcomputer 70. As a result, the cost of the integrated circuit 80 can be reduced.

(3) When the monitoring unit 81 determines that an abnormality has occurred in the microcomputer 70 or when the power supply control unit 82 determines that an abnormality has occurred in the power supply circuit 45, the modulation factor M and the voltage phase δ inputted to the second command value calculating unit 86 is invalidated. Therefore, a situation in which incorrect drive signals are generated can be prevented. In addition, discharge control and evacuation travelling control can be properly performed. Furthermore, the integrated circuit 80 that is provided with the drive signal generation function includes therein the monitoring unit 81 and the power supply control unit 82. Therefore, transition to discharge control or evacuation travelling control can be promptly performed during an abnormality in the microcomputer 70 or the power supply circuit 45.

(4) The integrated circuit 80 includes therein the correcting unit 84. As a result, the variation error β and the delay error γ can be removed from the resolver angle. The accuracy of calculation of command values based on the rotation speed can be improved. In addition, the accuracy of torque control of the motor generator 40 can also be improved.

(5) Discharge control and evacuation travelling control are performed based on the phase currents and the first and second voltages VL and VH. Therefore, discharge control and evacuation travelling control can be properly performed.

(6) When an abnormality occurs in the microcomputer 70 or the power supply circuit 45 during low-speed rotation of the motor generator 40 in which regeneration is not performed, all switching elements Sup to Swn configuring the inverter 30 are turned OFF. As a result, vehicle safety during an abnormality in the microcomputer 70 or the like can be improved.

(Other Embodiments)

The above-described embodiment may be modified as follows.

Discharge control may be performed while only either of the first voltage VL and the second voltage VH is being monitored. A reason for this is that, when the inter-terminal voltage of the second capacitor 22 decreases as a result of discharge control, the electrical charge accumulated in the first capacitor 21 is discharged via the freewheeling diode Dcp.

The correcting unit 84 may remove only either of the variation error β and the delay error γ.

The angle sensor 44 (resolver) is not limited to the one-phase excitation two-phase output type. For example, the angle sensor 44 may be a two-phase excitation two-phase output type. Specifically, in this resolver, alternating-current signals having the same amplitude and phases differing from each other by 90° are inputted to each primary-side coil forming a pair. From secondary-side coils forming a pair, a pair of output signals having phases differing from each other by 90° and that are based on the electrical angle of the rotor are outputted.

According to the above-described embodiment, the monitoring unit 81 is provided with a function of outputting the reset signal RESET to the microcomputer 70. However, this function is not essential.

In addition, the angle sensor 44 is not limited to the resolver. The angle sensor 44 may be another angle sensor as long as the sensor outputs an output signal based on the electrical angle of the motor generator 40.

The switching elements configuring the inverter 30 and the step-up converter 20 are not limited to IGBTs. For example, the switching element may be a metal-oxide-semiconductor field-effect transistor (MOSFET). In addition, the step-up converter 20 may be eliminated from the control system. In this case, the high-voltage battery 10 is connected to the inverter 30 with the system main relay 11 therebetween.

The angle converting unit is not limited to that providing the function of the RD converter 83. For example, the angle converting unit may be an encoder that receives an A-phase signal, a B-phase signal, a Z-phase signal, and the like, and converts the signals to angles.

When the rotating electric machine is not an IPMSM, the drive signals may be generated based on command values corresponding to the characteristics of the rotating electric machine. As a result, effects similar to those according to the above-described embodiment can be achieved. A rotating electric machine other than the IPMSM includes, for example, a surface permanent magnet synchronous motor (SPMSM), an induction motor (IM), a synchronous reluctance motor (SynRM), and the like.

The vehicle is not limited to the parallel hybrid car. The vehicle may be another vehicle as long as the vehicle includes a rotating electric machine. In addition, application of the present disclosure is not limited to the control system of an onboard rotating electric machine.

What is claimed is:

1. An integrated circuit formed into a single chip, for a control system of a rotating electric machine that is electrically connected to a power conversion circuit, the integrated circuit comprising:
    a drive signal generating unit that is incorporated in the integrated circuit, which generates drive signals for switching elements configuring the power conversion circuit;
    a monitoring unit that is incorporated in the integrated circuit, and monitors a microcomputer that is provided separately from the integrated circuit and calculates generation information that is information used to generate the drive signals, the monitoring unit determining whether or not an abnormality has occurred in the microcomputer; and
    an angle converting unit that is incorporated in the integrated circuit, which receives an output signal from an angle sensor that outputs the output signal based on a rotation angle of the rotating electric machine, the angle converting unit converting the output signal of the angle sensor to rotation angle information of the rotating electric machine, wherein
    the drive signal generating unit is configured to
        generate the drive signals for controlling driving of the rotating electric machine based on the generation information calculated by the microcomputer and the rotation angle information obtained by conversion by the angle converting unit when the monitoring unit determines that an abnormality has not occurred in the microcomputer, and
        generate the drive signals based on the rotation angle information, without using the generation information, when the monitoring unit determines that an abnormality has occurred in the microcomputer.

2. The integrated circuit according to claim 1, further comprising:
    a command value calculating unit that is incorporated in the integrated circuit, which calculates a voltage command value of voltage to be applied to the rotating electric machine when the monitoring unit determines that an abnormality has occurred in the microcomputer, wherein
    the drive signal generating unit is configured to generate the drive signals using the voltage command value calculated by the command value calculating unit as input, when the monitoring unit determines that an abnormality has occurred in the microcomputer.

3. The integrated circuit according to claim 2, wherein:
    the command value calculating unit calculates the voltage command value to control an output torque of the rotating electric machine to become zero.

4. The integrated circuit according to claim 2, wherein:
    the command value calculating unit includes a rotation speed calculating unit that calculates a rotation speed of the rotating electric machine with the rotation angle information as input, and calculates the voltage command value with the rotation speed calculated by the rotation speed calculating unit or a command rotation speed calculated based on the calculated rotation speed as input.

5. The integrated circuit according to claim 1, wherein:
    the power conversion circuit includes an inverter that is provided with serially connected members composed of upper-arm switching elements and lower-arm switching elements as the switching elements;
    the serially connected members are connected in parallel to a capacitor; and
    the drive signal generating unit is configured to generate drive signals for performing discharge control of the capacitor and for driving the upper-arm switching elements and lower-arm switching elements, based on the rotation angle information, when the monitoring unit determines that an abnormality has occurred in the microcomputer.

6. The integrated circuit according to claim 1, wherein:
    the control system is mounted in a vehicle in which power from the rotating electric machine is able to be transmitted to a driving wheel; and
    the drive signal generating unit is configured to generate the drive signals for rotatably driving the rotating electric machine and making the vehicle perform evacuation travelling, based on the rotation angle information, when the monitoring unit determines that an abnormality has occurred in the microcomputer.

7. The integrated circuit according to claim 1, wherein:
the power conversion circuit includes an inverter that is provided with serially connected members composed of upper-arm switching elements and lower-arm switching elements as switching elements;
the serially connected members are connected in parallel to a capacitor;
the integrated circuit further includes a voltage acquiring unit that is incorporated in the integrated circuit, and acquires information related to an inter-terminal voltage of the capacitor; and
the drive signal generating unit is configured to generate the drive signals based on the information acquired by the voltage acquiring unit, when the monitoring unit determines that an abnormality has occurred in the microcomputer.

8. The integrated circuit according to claim 1, further comprising:
a current acquiring unit that is incorporated in the integrated circuit, and acquires information related to current flowing to the rotating electric machine, wherein:
the drive signal generating unit is configured to generate the drive signals based on the information acquired by the current acquiring unit, when the monitoring unit determines that an abnormality has occurred in the microcomputer.

9. The integrated circuit according to claim 1, wherein the power conversion circuit includes an inverter that is provided with serially connected members composed of upper-arm switching elements and lower-arm switching elements as the switching elements; and
the drive signal generating unit stops output of the drive signals to stop the driving of all of the upper-arm switching elements and lower-arm switching elements, under a condition that rotation speed of the rotating electric machine calculated based on the rotation angle information is a predetermined speed or lower, when the monitoring unit determines that an abnormality has occurred in the microcomputer.

10. The integrated circuit according to claim 1, wherein:
the angle converting unit, in addition to the drive signal generating unit, outputs the rotation angle information to the microcomputer.

11. The integrated circuit according to claim 1, wherein:
the integrated circuit is configured to invalidate the generation information inputted from the microcomputer when the monitoring unit determines than an abnormality has occurred in the microcomputer.

12. The integrated circuit according to claim 1, wherein:
the control system includes a power supply circuit that serves as a power supply source of the microcomputer;
the integrated circuit further comprises a power supply control unit that is incorporated in the integrated circuit, and provides a function of controlling voltage supplied from the power supply circuit to the microcomputer and a function of monitoring the power supply circuit; and
the drive signal generating unit is configured to generate the drive signals based on the rotation angle information, without using the generation information, when the power supply control unit determines that an abnormality has occurred in the power supply circuit.

13. The integrated circuit according to claim 12, wherein:
the integrated circuit is configured to invalidate the generation information inputted from the microcomputer when the power supply control unit determines that an abnormality has occurred in the power supply circuit.

14. The integrated circuit according to claim 1, further comprising:
a correcting unit that is incorporated in the integrated circuit, which corrects the rotation angle information obtained by conversion by the angle converting unit so as to remove at least either of delay error or cycle variation error corresponding to a single cycle of an angle detected based on the output signal from the angle sensor.

15. A control apparatus for a control system of a rotating electric machine electrically connected to a power conversion circuit including switching elements, the control system comprising:
an integrated circuit that is formed into a single chip; and
a microcomputer that is provided separately from the integrated circuit, and calculates generation information that is information used to generate drive signals for the switching elements,
the integrated circuit comprising:
a drive signal generating unit that is incorporated in the integrated circuit, and generates the drive signals for the switching elements;
a monitoring unit that is incorporated in the integrated circuit, and monitors the microcomputer, and determines whether or not an abnormality has occurred in the microcomputer; and
an angle converting unit that is incorporated in the integrated circuit, receives an output signal from an angle sensor that outputs the output signal based on a rotation angle of the rotating electric machine, the angle converting unit converting the output signal of the angle sensor to rotation angle information of the rotating electric machine, wherein
the drive signal generating unit is configured to
generate the drive signals for controlling driving of the rotating electric machine based on the generation information calculated by the microcomputer and the rotation angle information obtained by conversion by the angle converting unit when the monitoring unit determines that an abnormality has not occurred in the microcomputer, and
generate the drive signals based on the rotation angle information, without using the generation information, when the monitoring unit determines that an abnormality has occurred in the microcomputer.

* * * * *